United States Patent [19]

Santandrea et al.

[11] Patent Number: 4,768,727
[45] Date of Patent: Sep. 6, 1988

[54] DEVICE FOR TRANSFERRING A PALLET-MOUNTED ELECTRIC MOTOR ARMATURE TO AN ARMATURE WINDING FORMATION STATION

[75] Inventors: Luciano Santandrea; Sabatino Luciani, both of Florence, Italy

[73] Assignee: Axis S.p.A., Florence, Italy

[21] Appl. No.: 840,672

[22] Filed: Mar. 18, 1986

[30] Foreign Application Priority Data

Jul. 18, 1985 [IT] Italy ............................... 21624 A/85

[51] Int. Cl.⁴ ..................... H02K 15/09; B65G 29/00
[52] U.S. Cl. .................................. 242/7.05 R; 29/598; 29/736; 29/759; 198/346.1; 198/465.1; 242/7.05 B
[58] Field of Search ................. 29/596, 598, 732, 736, 29/735, 759, 760; 242/7.05 A, 7.05 B, 7.05 C, 7.05 R, 7.03, 7.04; 198/346.1, 803.01, 465.1

[56] References Cited

U.S. PATENT DOCUMENTS 4,087,054 5/1978 Finegold ..................... 242/7.05 B
4,262,853 4/1981 Dammar .
4,553,321 11/1985 Zihlmann et al. .................... 29/598

Primary Examiner—Carl E. Hall
Attorney, Agent, or Firm—Stevens, Davis, Miller & Mosher

[57] ABSTRACT

In a device for transferring a pallet-mounted electric motor armature to an armature winding formation station, the armature is made rigid with the pallet by members which enable it to be released therefrom, and the frame carrying the winding arms comprises a vertical gripper for gripping the armature and connected to drive means which cause it to rotate about its axis between said winding arms; means are also provided for vertically transferring either the armature alone or the armature rigid with the pallet from the conveyor belt to the winding arm zone in which the armature becomes released from the pallet and secured to the vertical gripper.

4 Claims, 4 Drawing Sheets

DEVICE FOR TRANSFERRING A PALLET-MOUNTED ELECTRIC MOTOR ARMATURE TO AN ARMATURE WINDING FORMATION STATION

DESCRIPTION

The invention relates to a device for transferring a pallet-mounted electric motor armature to an armature winding formation station. Armature production lines exist in which the armatures are mounted on pallets fed on conveyor belts disposed between the various working stations.

To enable the winding to be formed on the armature, the pallet comprises underlying members rigid with the armature and rotating in the pallet, for connection to motorised means for rotating the armature when it reaches the winding station.

In the station there is also provided a device which slightly raises the pallet from the conveyor belt so that there is no friction between these members during the time the pallet remains in the winding station while the belt continues to advance.

The described unit is rather complicated, and each pallet has to contain the aforesaid device which enables the supported armature to be rotated by the operation of underlying members to which it is connected, and thus the pallets themselves are also of complicated and costly type.

The object of the invention is to provide a unit for removing and conveying or simply transferring the armature-carrying pallet from the belt to the winding zone in which the armature, either fixed or not fixed to the pallet, is rotated by means which do not act by way of the pallet but which act directly on the armature itself. The armature according to the invention can be raised from the conveyor belt and transferred to the working station either while keeping it rigid with the pallet or after removing it from this latter. However, in both cases the armature is rotated not through the pallet but by external means connected to the specific working station.

These and further objects which will be more apparent hereinafter are attained according to the invention by a device for transferring a pallet-mounted electric motor armature to an armature winding formation station, characterised in that the armature is made rigid with the pallet by members which enable it to be released therefrom, and the frame carrying the winding arms comprises a vertical gripper for gripping the armature and connected to drive means which cause it to rotate about its axis between said winding arms; means being provided for vertically transferring at least the armature from the conveyor belt to the winding arm zone in which the armature becomes released from the pallet and secured to the vertical gripper.

Two embodiments of the device according to the invention are described hereinafter by way of non-limiting example with reference to the accompanying drawings, in which:

FIGS. 4 and 5 are enlarged sections through a detail of FIG. 1 in two operating positions;

FIG. 6 is a section on the line VI—VI of FIG. 1;

Figure 1:
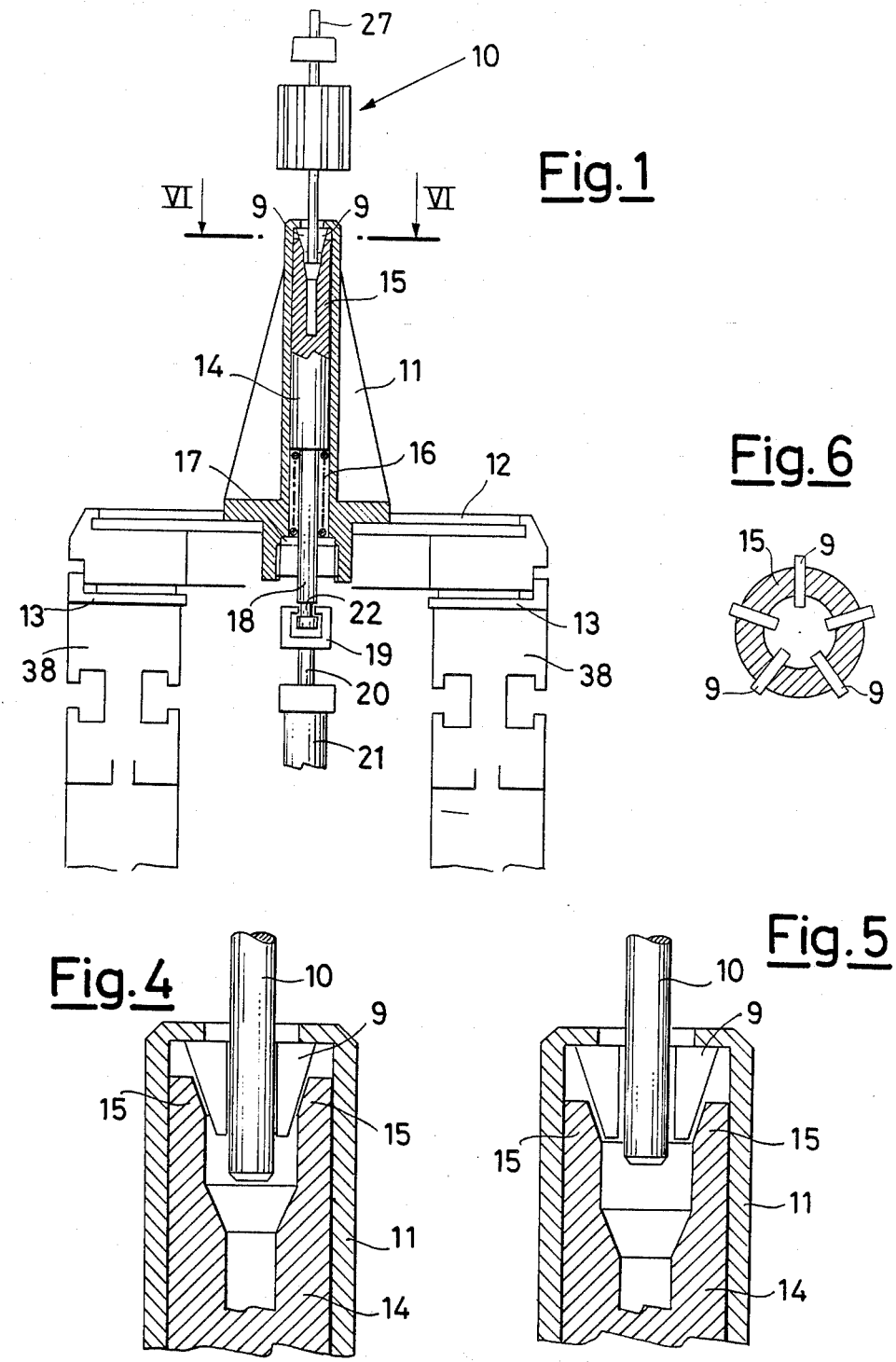
FIG. 1 is a partly sectional view of an armature mounted on a pallet according to the invention.

The armature 10 is releasably mounted in the upper cavity of a spigot 11 which is securely fixed to a pallet 12. This latter is slidable on conveyor belts 13.

In the spigot 11 there is slidable a shaft 14 provided with a conical end 15 in which metal inserts 9 (FIGS. 1, 4, 5 and 6) are inserted for locking the armature 10. The shaft 14 is urged into this locking position by a spring 16 located between shoulders on the shaft and the base 17 of the spigot 11.

As can be seen in FIG. 4, when the shaft 14 is urged upwards into the locking position, its conical end urges the inserts 9 to abut against the spindle of the armature 10, so locking it in the manner of a chuck.

When in the release position with the shaft 14 lowered by a distance which permits the inserts 9 no longer to press against the armature 10, which is therefore released from the clamping action of the chuck 15-9. The end 18 of the shaft 14 projects below the pallet 12 and comprises a circumferential groove 22 into which the claws 19 of a gripper carried by the rod 20 of a cylinder 21 can penetrate. By means of the device heretofore described, the armature 10 can be transferred by moving it vertically into the winding station by two different methods shown in FIGS. 2 and 3.

Figure 2:
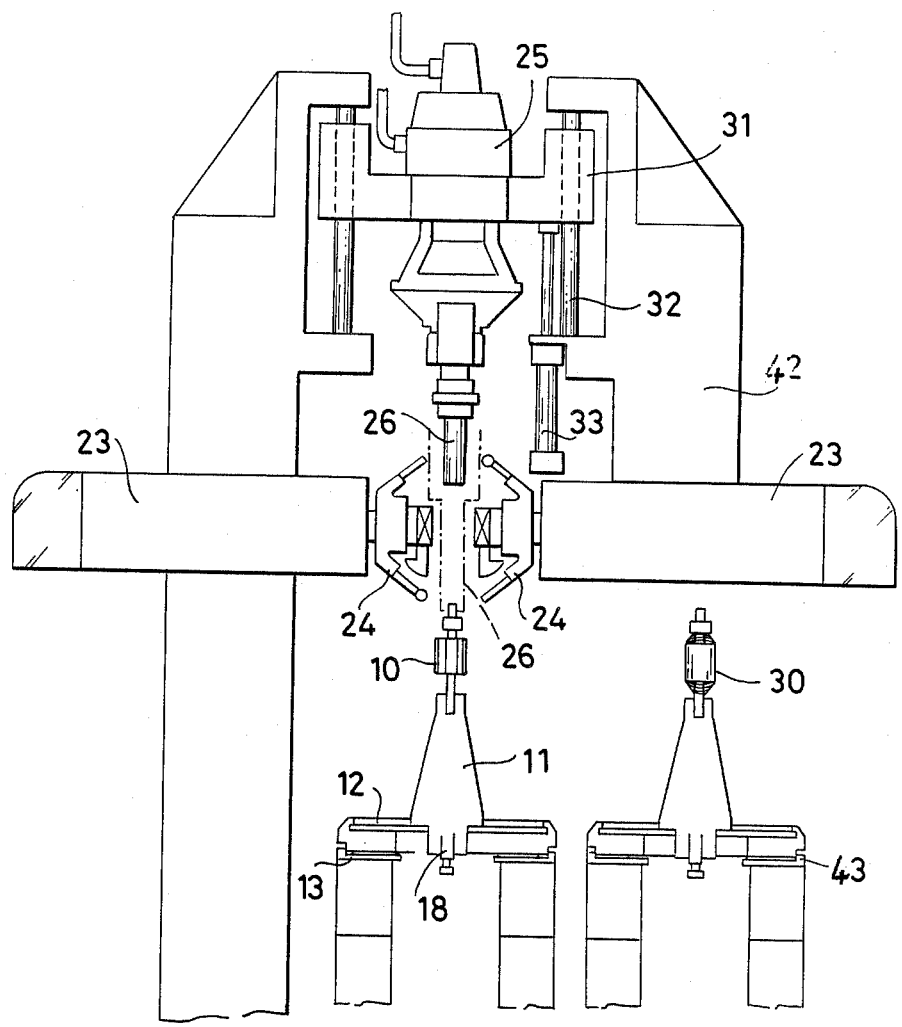
FIGS. 2 and 3 are embodiments of the device according to the invention for transferring the armature from the conveyor belt to the winding station.

In the first method shown in FIG. 2, a frame 42 is provided on which conventional winding arms 24 are mounted in opposing positions. A unit 25 for rotating the armature between the arms 24 is mounted in an upper vertical position on the frame 42.

According to the invention, the unit 25 comprises an end gripper 26 which can be moved downwards in order to grip the end 27 of the armature.

The unit 25 can for example be mounted on a carriage 31 slidable along guides 32 of the frame 42, by operating a piston 33 which moves the carriage 31 and hence the gripper 26.

When the pallet 12 reaches the predetermined position at the station shown in FIG. 2, the gripper 19 is moved downwards against the spring 16, so releasing the armature 10 from the clamping action of the inserts 9. Previously however, the upper gripper 26 will have been moved downwards (shown by dashed lines in FIG. 2) so as to grip the end 27 of the armature 10. In this manner the armature 10 is no longer secured to the pallet 12 but to the upper gripper 26 which, on being made to rise again by the action of the piston 33 which moves it by way of its carriage 31, locates the armature between the arms 24 where it rotates it about its axis while the arms form the winding.

Figure 3:
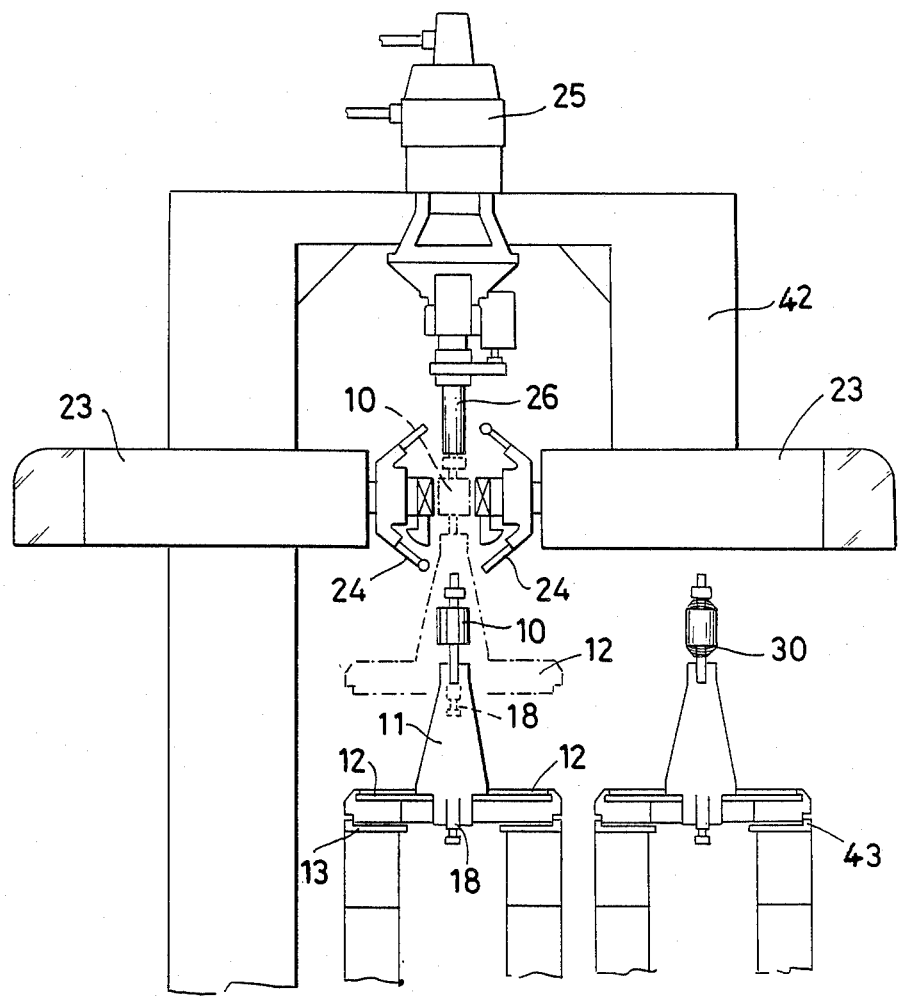

In the configuration of FIG. 3, the assembly comprising the motor 25 and gripper 26 is kept stationary on the frame 42, while the pallet 12 is raised into the position in which the windings is to be formed by the arms 24.

Figure 7:
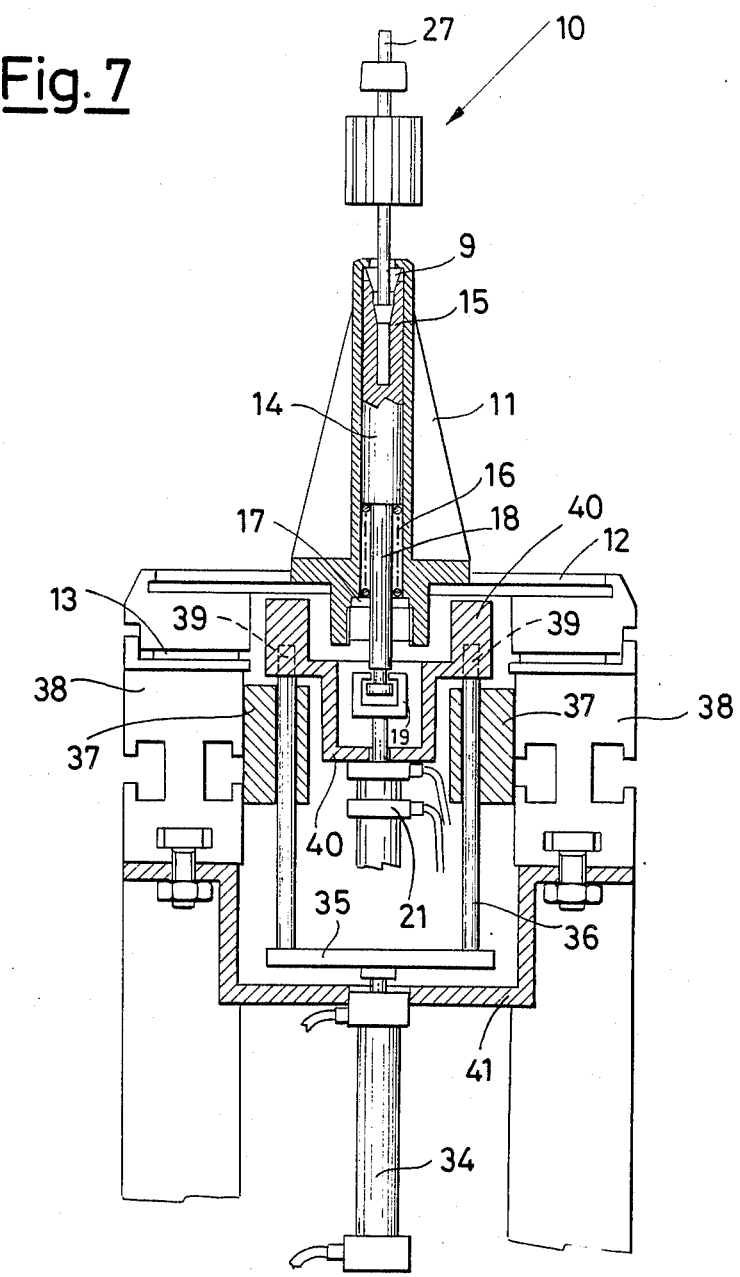
FIG. 7 is an enlarged section through a detail of FIG. 3.

A cylinder 34 (see FIG. 7 which shows a detailed view of the pallet 12) has its rod rigid with a fork 35, the bars 36 of which slide in guiding supports 37 fixed to the frame 38 on which the belts 13 slide. The ends 39 of the bars 36 are fixed to a support 40 which supports the piston 21 which opens the gripper 19, and supports the pallet 12. The cylinder 34 is also rigid with a structure 41 screwed to the frame 38.

When the rod of the cylinder 34 is extended, it causes the bars 36 to slide upwards with consequent separation of the pallet 12 from the belts 13, and its transference towards the winding arms 24 until it reaches the position shown by dashed lines in FIG. 3. At this point, the gripper 26 grips the armature as in the case of FIG. 2.

The gripper 19 is again operated in order to pull the shaft 18 downwards, so releasing the armature 10 from its connection to the pallet 12. This latter can be either relowered or kept in the raised position as it neither prejudices nor hinders the formation of the winding on the armature.

After the formation, the gripper 19 releases the shaft 18 and the armature thus becomes locked on the pallet 12. The upper gripper 26 releases its grip on the end 27, and the pallet is returned to the belt 13 by returning the rod of the cylinder 34 to the position shown in FIG. 7.

FIGS. 2 and 3 show the return of the wound armature 30 onto parallel belts 43 to the side of the working station.

We claim:

1. A device for transferring a pallet-mounted electric motor armature to an armature winding formation station, comprising a pallet, gripping means mounted on said pallet to releasably grip said armature to said pallet, a frame, spaced rotatable winding arms carried on said frame, rotatable drive means mounted on said frame, a vertical gripper for gripping the armature mounted on said drive means which cause said armature to rotate about an axis between said winding arms and means for vertically moving the armature whereby the armature releases from the pallet and is gripped by said vertical gripper, said gripping means mounted on said pallet to releasably grip said armature defining elastic blocks, a spigot, elastic means and a pin slidably mounted within said spigot and a pulling means, said blocks being interposed between said armature and said spigot and expandible in order to release the armature by the action of said pin sliding in said spigot against said elastic means, said pulling means biasing the pin against said elastic means to release the armature.

2. The device as claimed in claim 1, wherein said vertical gripper is movable vertically in order to grip the upper end of the armature and transfer said armature to between the winding arms, said arms being operated after releasing the armature from the pallet.

3. The device as claimed in claim 1, wherein said vertically moving means contact and raise said pallet in order to transfer the armature between the winding arms, where the vertical gripper grips an upper end of said armature and said armature is released from the pallet.

4. A device for transferring a pallet-mounted electric motor armature to an armature winding formation station, comprising a pallet, gripping means mounted on said pallet for gripping and releasing said armature, thereby holding said armature to said pallet, a frame, spaced rotatable winding arms carried on said frame, rotatable drive means mounted on said frame for rotating said armature about an axis between said winding arms, a vertical gripper mounted on said drive axis for gripping the armature and supporting same between said spaced rotatable winding arms and means for vertically moving the armature including means for contacting and raising said pallet to transfer the armature between the winding whereby the armature is released from the pallet and an upper end of the armature is gripped by said vertical gripper.

* * * * *